(12) United States Patent
Thomas et al.

(10) Patent No.: US 11,196,314 B2
(45) Date of Patent: Dec. 7, 2021

(54) SEGMENTED STATOR ELECTRICAL MACHINE

(71) Applicant: Siemens Gamesa Renewable Energy A/S, Brande (DK)

(72) Inventors: Arwyn Thomas, Cheshire (GB); Yan-Xin Li, Sheffield (GB); Zi-Qiang Zhu, Sheffield (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/482,736

(22) PCT Filed: Jan. 23, 2018

(86) PCT No.: PCT/EP2018/051535
§ 371 (c)(1),
(2) Date: Aug. 1, 2019

(87) PCT Pub. No.: WO2018/141579
PCT Pub. Date: Aug. 9, 2018

(65) Prior Publication Data
US 2020/0235624 A1 Jul. 23, 2020

(30) Foreign Application Priority Data
Feb. 2, 2017 (DE) .......................... 102017201696.5

(51) Int. Cl.
*H02K 3/20* (2006.01)
*F03D 9/25* (2016.01)
(Continued)

(52) U.S. Cl.
CPC ................ *H02K 3/20* (2013.01); *F03D 9/25* (2016.05); *H02K 1/148* (2013.01); *H02K 1/2786* (2013.01);
(Continued)

(58) Field of Classification Search
CPC .... H02K 1/148; H02K 7/1807; H02K 7/1815; H02K 7/1823; H02K 7/1838
(Continued)

(56) References Cited

U.S. PATENT DOCUMENTS

2004/0263016 A1 12/2004 Neet
2006/0096329 A1 5/2006 Kim et al.
(Continued)

FOREIGN PATENT DOCUMENTS

CN 1531167 A 9/2004
CN 1889338 A 1/2007
(Continued)

OTHER PUBLICATIONS

Bianchi, et al., "Design considerations on fractional-slot fault-tolerant synchronous motors," in IEEE International Conference on Electric Machines and Drives (IEMDC2005), May 15, 2005, pp. 902-909; 8 pages.
(Continued)

*Primary Examiner* — Terrance L Kenerly
(74) *Attorney, Agent, or Firm* — Schmeiser, Olsen & Watts LLP

(57) ABSTRACT

Provided is an arrangement for an electrical machine having fractional slot topology, including: plural stator segments, each stator segment having plural teeth alternating with plural slots in a circumferential direction, each stator segment having at both circumferential ends a tooth portion; for each phase of plural phases a conductor wound in coils around teeth of the plural teeth, wherein the number of coils of any phase in any stator segment is the same as the number of coils of any other phase in this stator segment.

12 Claims, 15 Drawing Sheets

(51) Int. Cl.
  *H02K 1/14* (2006.01)
  *H02K 1/27* (2006.01)
  *H02K 7/18* (2006.01)

(52) U.S. Cl.
  CPC ....... *H02K 7/1838* (2013.01); *H02K 2213/03* (2013.01); *H02K 2213/06* (2013.01)

(58) Field of Classification Search
  USPC .......................................... 310/179, 216.029
  See application file for complete search history.

(56) References Cited

U.S. PATENT DOCUMENTS

| | | | |
|---|---|---|---|
| 2011/0266913 A1 | 11/2011 | Zirin et al. | |
| 2012/0074797 A1 | 3/2012 | Petter et al. | |
| 2014/0021279 A1 | 1/2014 | Rittler et al. | |
| 2014/0035425 A1 | 2/2014 | Gurakuq | |
| 2014/0091673 A1 | 4/2014 | Anbarasu et al. | |
| 2015/0084342 A1* | 3/2015 | Arata ...................... | H02K 3/28 290/55 |
| 2015/0137652 A1* | 5/2015 | Petter ..................... | H02K 21/16 310/216.072 |
| 2016/0241100 A1* | 8/2016 | Ito ........................... | H02K 3/28 |

FOREIGN PATENT DOCUMENTS

| | | |
|---|---|---|
| CN | 102115965 A | 7/2011 |
| CN | 102386694 A | 3/2012 |
| CN | 103210566 A | 7/2013 |
| CN | 104467212 A | 3/2015 |
| CN | 104467224 A | 3/2015 |
| CN | 104956573 A | 9/2015 |
| CN | 105406629 A | 3/2016 |
| CN | 105680585 A | 6/2016 |
| DE | 602004012750 T2 | 4/2009 |
| DE | 102011011023 A1 | 8/2012 |
| EP | 2805406 A2 | 11/2014 |
| EP | 2922177 A1 | 9/2015 |
| GB | 2278738 B | 8/1996 |
| JP | 2010268549 A | 11/2010 |
| WO | 03073591 A1 | 9/2003 |
| WO | 201411730 A1 | 8/2014 |
| WO | 2014117350 A1 | 8/2014 |
| WO | 2015106891 A2 | 7/2015 |
| WO | 2017101637 A1 | 6/2017 |

OTHER PUBLICATIONS

Ishak et al., "Permanent-magnet brushless machines with unequal tooth widths and similar slot and pole numbers"; IEEE Trans. Ind. Appl., vol. 41, No. 2, pp. 584-590, Mar./Apr. 2005; 7 pages.

Barcaro, et al., "Configurations of fractional-slot IPM motors with dual three-phase winding"; in IEEE International Electric Machines and Drives Conference (IEMDC 2009), May 3-6, 2009, pp. 936-942; 7 pages.

Fornasiero, et al., "Considerations on selecting fractional-slot windings"; in Proc. IEEE ECCE, Atlanta, GA, Sep. 12-16, 2010, pp. 1376-1383; 8 pages.

Chen, et al., "Modular stator structure permanent magnet synchronous machine"; in World Automation Congress (WAC 2008), Sep. 28-Oct. 2, 2008, pp. 1-5; 5 pages.

Cros, et al., "Synthesis of High Performance PM Motors with Concentrated Windings"; IEEE Transactions On Energy Conversion; vol. 17 No. 2; 2002; 6 pages.

El-Refaie, "Optimal Flux Weakening In Surface PM Machines Using Concentrated Windings"; in Conf. Rec. IEEE IAS Annu. Meeting, Oct. 3-7, 2004, pp. 1038-1047; 10 pages.

Mecrow, et al., "Fault Tolerant Permanent Magnet Machine Drives"; in Seventh International Conference on Electrical Machines and Drives, Sep. 11-24, 1995, pp. 433-437; 5 pages.

International Search Report and Written Opinion in related PCT Patent Application No. PCT/EP2018/051535, dated May 22, 2018. 13 pages.

Search Report in related Germany Patent Application No. 10 2017 201 696.5, dated Nov. 30, 2017. 7 pages.

International Search Report for application No. PCT/EP2018/051535 dated May 22, 2018.

Office Action in corresponding Chinese Patent Application No. 201880015415.2 dated Sep. 30, 2020. 7 pages.

Office Action in corresponding Chinese Patent Application No. 201880015415.2 dated Apr. 20, 2021. 7 pages.

* cited by examiner

100

SEGMENTED STATOR ELECTRICAL MACHINE

CROSS-REFERENCE TO RELATED APPLICATIONS

This application claims priority to PCT Application No. PCT/EP2018/051535, having a filing date of Jan. 23, 2018, which is based on German Application No. 10 2017 201 696.54, having a filing date of Feb. 2, 2017, the entire contents both of which are hereby incorporated by reference.

FIELD OF TECHNOLOGY

The following relate to an arrangement for an electrical machine having fractional slot topology, relates to a manufacturing method for manufacturing the arrangement, relates to a generator and further relates to a wind turbine.

BACKGROUND

GB 2 278 738 A discloses a modular electromagnetic machine, in particular a directly-coupled AC generator, consisting of a rotor ring with permanent magnets coaxial with a respective stator ring comprising a plurality of laminated yokes, each yoke defining coil slots receiving coils. Thereby, the yokes and coils form modules supported by beams relative to the rotor ring.

DE 10 2011 011 023 A1 discloses an electrical machine having a stator and a rotatable rotor, wherein the stator comprises a first and at least a second winding system comprising coils which are arranged in slots of the stator and which are wound around teeth of the stator. Thereby, at least one unwound tooth is present. When the first and the second winding system are combined, all teeth of the stator have windings.

Conventionally, a fractional-slot type of electrical machine is known, wherein Ns/(Np*m) is a fraction (thus a rational number, not an integer), wherein Ns is the number of slots and Np is the number of poles of the electrical machine (the number of poles being equal or corresponding to the number of magnets, in particular permanent magnets). The fractional slot concentrated windings with segmented stator can be applied in electrical machines with different slot/pole number combinations, while the edge of each segment is protected by a redundant tooth.

Conventionally, three methods may have been used to address the above-mentioned technical problem. Two of them may be based on winding topology arrangement and the third kind may require to modify the stator design. For the winding topology available for the segment stator with redundant teeth, alternative teeth wound windings and the mixed layer winding may be effective. The alternative teeth wound winding may achieve stable and secure manufacturing, but the electromagnetic performance may be inferior to the corresponding counterpart with all teeth wound winding. Low power factor due to the high self-inductance and high rotor loss because of abundant harmonics and high torque ripple caused by local saturation may be major disadvantages.

The mixed layer winding technology may be another method for segmented stator application which may be effective for single three-phase electrical machines. However, there may be too much space wasted due to the redundant teeth. Furthermore, if the electrical machine consists of several relatively simple machine units, the unbalanced performance may result, especially for multiple multi-phase machines (e.g. dual three-phase electrical machines).

When the stator does not have uniform distributed slots and teeth, the redundant teeth for isolating each stator segment may be applied. However, back-EMF harmonics may be abundant for this type of electrical machine due to the fill pitch and concentrated winding arrangement. The torque ripple may also be relatively large, which may compromise some advantages of fractional-slot electrical machines.

The prior art solutions may have the drawback, that the performance is not satisfactory or manufacturing, transport and/or assembling is difficult without introducing damage to portions of the systems.

There may be a need for an arrangement for an electrical machine, for a generator, for a wind turbine and for a manufacturing method, wherein the performance of the arrangement for the electrical machine is improved relative to the conventional system and wherein at the same time damage of the individual stator segments can be avoided.

SUMMARY

According to an embodiment of the present invention it is provided an arrangement for an electrical machine having fractional slot topology, comprising: plural stator segments, each stator segment having plural teeth alternating with plural slots in a circumferential direction, each stator segment having at both circumferential ends a tooth portion; for each phase of plural phases a conductor wound in coils around teeth of the plural teeth, wherein the number of coils of any phase in any stator segment is the same as the number of coils of any other phase in this stator segment.

According to embodiments of the present invention, the arrangement for the electrical machine allows a totally enclosed winding at the edge of the stator segment, thereby improving manufacturing and transport requirements. Furthermore, embodiments of the present invention provide an arrangement for an electrical machine, in particular a generator, having the same balanced electrical performances as a conventional fractional-slot electrical machine which does not have stator segments but which comprises an integrally formed stator around the entire circumference.

The electrical machine may in particular be a permanent magnet synchronous electrical machine. The electrical machine may be or comprise a motor or a generator. Each of the plural stator segments may comprise a laminate or laminated stack of ferromagnetical material of high magnetic permeability. The laminates may be isolated from each other. Within the arrangement, the stator segments may be connected to each other at their circumferential ends. When the circumferential ends are connected, a tooth may form which is however not surrounded by any conductor corresponding or contributing to one of the plural phases. Since the stator segment ends at the tooth portion, a conductor wound around teeth apart from the circumferential end is protected by the tooth portion at the end. Thereby, damage of the conductor wound around the inner teeth may be reduced and also deformation of the conductor wound around the inner teeth may be reduced, for example during transport and/or during assembling the plural stator segment which may carry the plural coils.

The conductor may comprise a wire which may carry an insulation at the surface. The teeth may protrude in the radial direction, for example outwards, when the electrical machine has an outer rotor. Alternatively, the teeth may protrude radially inwards, when the electrical machine has an inner rotor.

The different phases may be shifted relative to each other by an angle equal to 360° divided by the number of phases. The conductor may be wound several times around a tooth to form a coil. When the number of coils of any phase in any stator segment is the same as the number of coils of any other phase in this stator segment, it may be ensured that each phase contributes the same amount of power, when the electrical machine is configured as a generator. Thereby, the performance may be improved.

The number of stator segments may be two, three, four, five, six or even a number larger than six. The number of slots and number of poles of the first fractional topology may satisfy the conventionally known relationship such that the number of slots divided by the number of poles and divided by the number of phases is a fractional number (thus not an integer).

The number of phases, for each of the electrical machines according to embodiments of the present invention, may be two, three, four, six or even a higher number.

According to an embodiment of the present invention, the arrangement further comprises a rotor having plural permanent magnets and rotationally supported to be rotatable around the stator segments, the permanent magnet being magnetically coupled to the coils.

Alternatively, electromagnets may be used. The rotor may be an inner rotor or an outer rotor. The number of magnets (in particular permanent magnets or electromagnets) may be selected based on the number of stator segments and the number of phases such as to result in a fractional-slot electrical machine and such that the number of coils of any phase in any stator segment is the same as the number of coils of any other phase in this stator segment. Thereby, a particular relationship may be required to be fulfilled.

According to an embodiment of the present invention, the fractional slot topology is given by combining a first fractional topology times a number of stator segments and one second fractional topology being different from the first fractional topology.

The first fractional topology may be defined by a particular number of slots and a particular number of poles for each stator segment. The second fractional topology likewise may also be defined by a particular number of slots and a corresponding number of poles (or permanent magnets or electromagnets) interacting with this stator segment.

According to an embodiment of the present invention, the first fractional topology and/or the second fractional topology is given by $$Ns=Np+/-1$$

or $$Ns=Np+/-2,$$

wherein
Np is the total number of poles,
Ns is the total number of slots.

The total number of poles is the number of poles of the complete electrical machine and the total number of slots is the number of slots of the complete electrical machine. With the specification of the total number of poles and the total number of slots as given above, the objective to achieve a balanced electrical machine may be achieved.

According to an embodiment of the present invention, the number of stator segments is three, $$Np \ne 3*k-2, \text{ wherein } k \text{ is a positive integer,}$$

$$Ns/(m*GCD(Ns,Np/2)))=n, \text{ wherein } n \text{ is positive integer,}$$

Np is the total number of poles,
Ns is the total number of slots,
m is the number of phases,
GCD(x,y) is the greatest common denominator of x and y.

Thereby, an effective electrical machine having three stator segments may be provided.

According to an embodiment of the present invention, the number of stator segments is three and the first fractional topology is nine slots and eight poles (9S/8P) and the second fractional topology is three slots and two poles (3S/2P) or the first fractional topology is 12 slots and 10 poles (12S/10P) and the second fractional topology is three slots and two poles (3S/2P).

Thereby, particular examples of the fractional slot topology are given. Other topologies are possible.

According to an embodiment of the present invention, the number of stator segments is six, $$Np \ne 3*k-1, \text{ wherein } k \text{ is positive integer,}$$

$$Ns/(GCD(Ns,Np/2))) \ne 2*n-1, \text{ wherein } n \text{ is positive integer,}$$

Np is the total number of poles and
Ns is the total number of slots,
GCD(x,y) is the greatest common denominator of x and y.

Thereby, the number of phases is any positive integer number, such as two, three, four, etc.

Thereby, also an electrical machine having six stator segments is enabled.

According to an embodiment of the present invention, the number of stator segments is six and the first fractional topology is 12 slots and 10 poles (12S/10P) and the second fractional topology is six slots and two poles (6S/2P).

Thus, also a six stator segment electrical machine can be obtained. The number of phases may be three or larger than three.

According to an embodiment of the present invention, a generator comprising the arrangement is provided. When the rotor rotates relative to the assembled stator segment, electrical power may be generated within the conductors corresponding to the different phases. Due to the balanced distribution of coils for all different phases, all phases may contribute a same amount of electrical power.

According to an embodiment of the present invention, a wind turbine is provided which comprises a turbine rotor with plural blades, a generator according to one of the embodiments as explained above, and, in particular, a converter coupled to an output terminal of the generator.

The generator may be assembled at the wind turbine operation site. Thereby, it may be avoided to transport the entirely manufactured and assembled generator to the wind turbine operation site.

It should be understood that features disclosed in connection with the arrangement for an electrical machine may also be applied, individually or in any combination, to a method for manufacturing an arrangement for an electrical machine according to embodiments of the present invention and vice versa.

According to an embodiment of the present invention it is provided a method of manufacturing an arrangement for an electrical machine having fractional slot topology, the method comprising: providing plural stator segments, each stator segment having plural teeth alternating with plural slots in a circumferential direction, each stator segment having at both circumferential ends a tooth portion; assembling the plural stator segments by connecting them at their circumferential ends; arranging, for each phase of plural phases a conductor in coils around teeth of the plural teeth, wherein the number of coils of any phase in any stator segment is the same as the number of coils of any other phase in this stator segment.

The plural stator segments may be provided with the conductor for the plural phases before assembling the plural stator segments by connecting them at their circumferential ends. For example, the conductors may be arranged, in particular wound around the teeth at a manufacturing site and then the plural stator segments together with the coils may be transported to a wind turbine operation site where the plural stator segments are connected together at their circumferential ends, to complete the entire stator.

Furthermore, a rotor having plural permanent magnets (or electromagnets) and being rotationally supported to be rotatable around the assembled stator segments may be arranged such that the permanent magnets are magnetically coupled to the coils. The generator may for example be arranged within a nacelle of the wind turbine.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

BRIEF DESCRIPTION

Some of the embodiments will be described in detail, with reference to the following figures, wherein like designations denote like members, where in:

FIG. 1 schematically illustrates in a frontal view an arrangement for an electrical machine according to an embodiment of the present invention providing three phases;

FIG. 2 schematically illustrates in a frontal view an arrangement for an electrical machine according to an embodiment of the present invention providing a multiplicity of three phases;

FIG. 3 schematically illustrates in a frontal view an electrical machine according to the prior art providing three phases;

FIG. 4 schematically illustrates in a frontal view an electrical machine according to the prior art providing a multiplicity of three phases;

FIG. 5 schematically illustrates in a frontal view an arrangement for an electrical machine according to an embodiment of the present invention providing three phases;

FIG. 6 schematically illustrates in a frontal view an arrangement for an electrical machine according to an embodiment of the present invention providing a multiplicity of three phases;

FIG. 7 schematically illustrates in a frontal view an electrical machine according to the prior art providing three phases;

FIG. 8 schematically illustrates in a frontal view an electrical machine according to the prior art providing a multiplicity of three phases;

Figure 19:
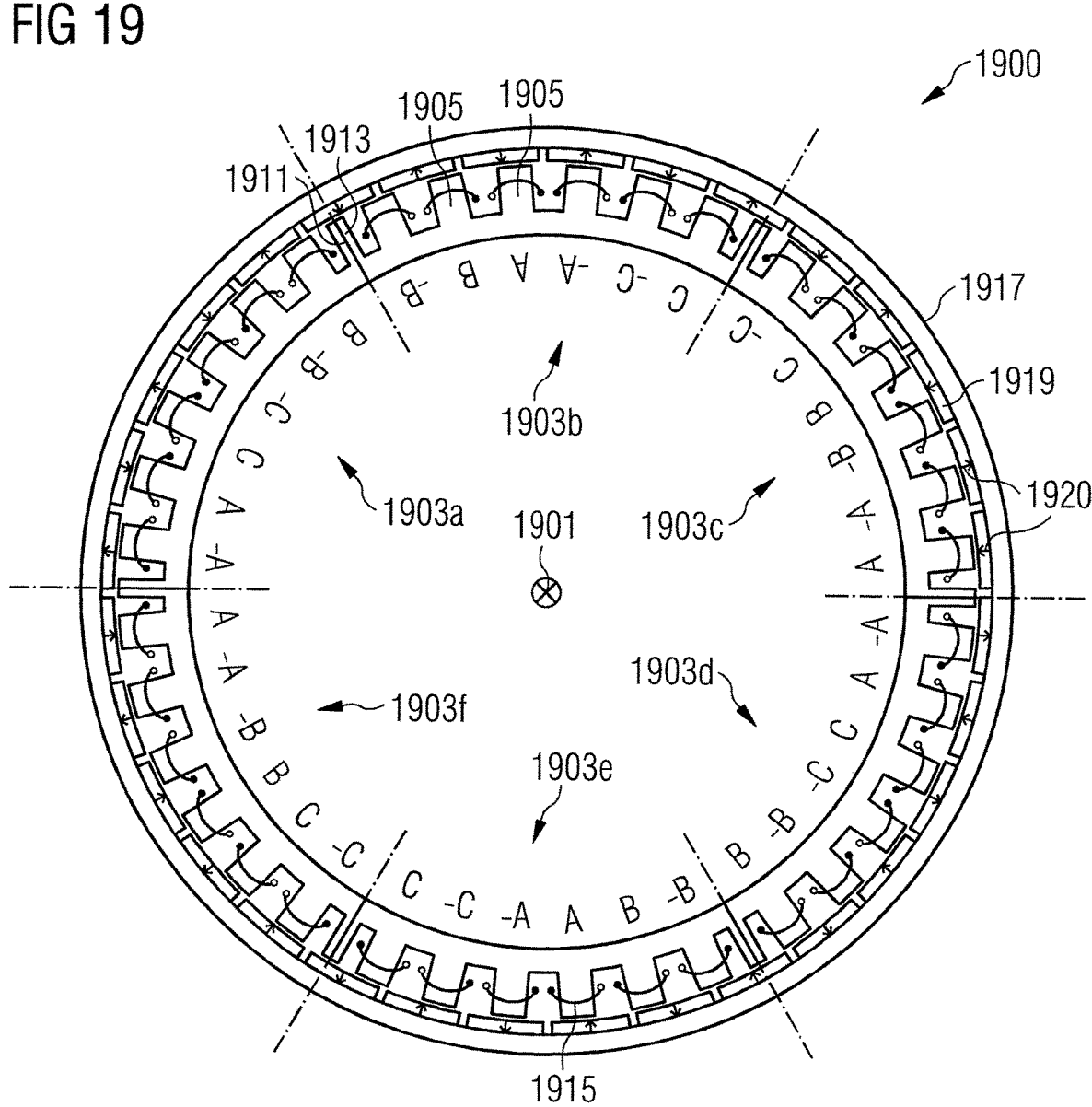
Figure 20:
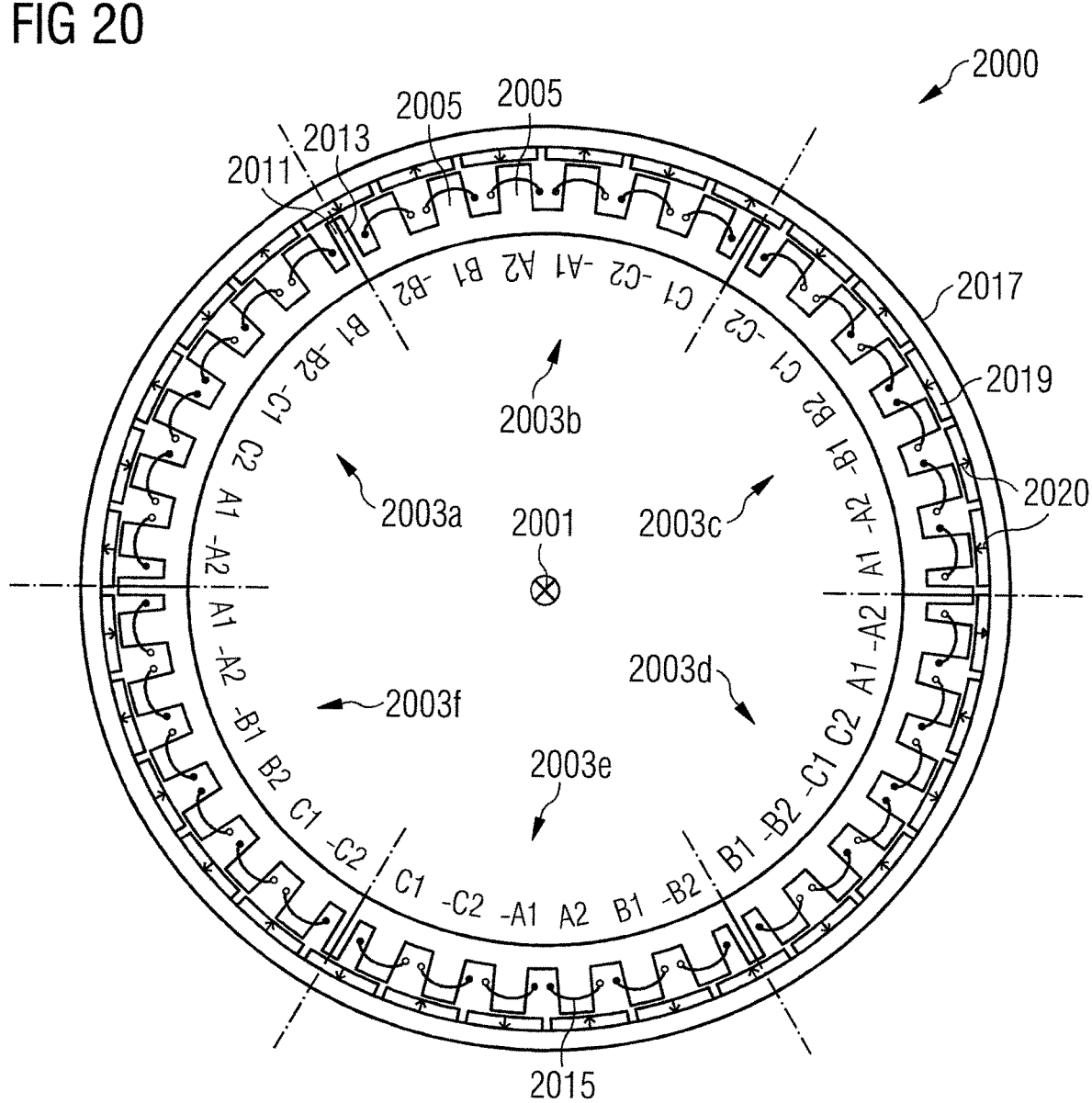

FIG. 19 schematically illustrates in a frontal view an arrangement for an electrical machine according to an embodiment of the present invention having six stator segments and providing three phases; and FIG. 20 schematically illustrates in a frontal view an arrangement for an electrical machine according to an embodiment of the present invention having six stator segments and providing a multiplicity of three phases.

DETAILED DESCRIPTION

The illustration in the drawings is in schematic form. It is noted that in different figures, similar or identical elements are provided with the same reference signs or with reference signs, which are different from the corresponding reference signs only within the first digit.

Figure 1:
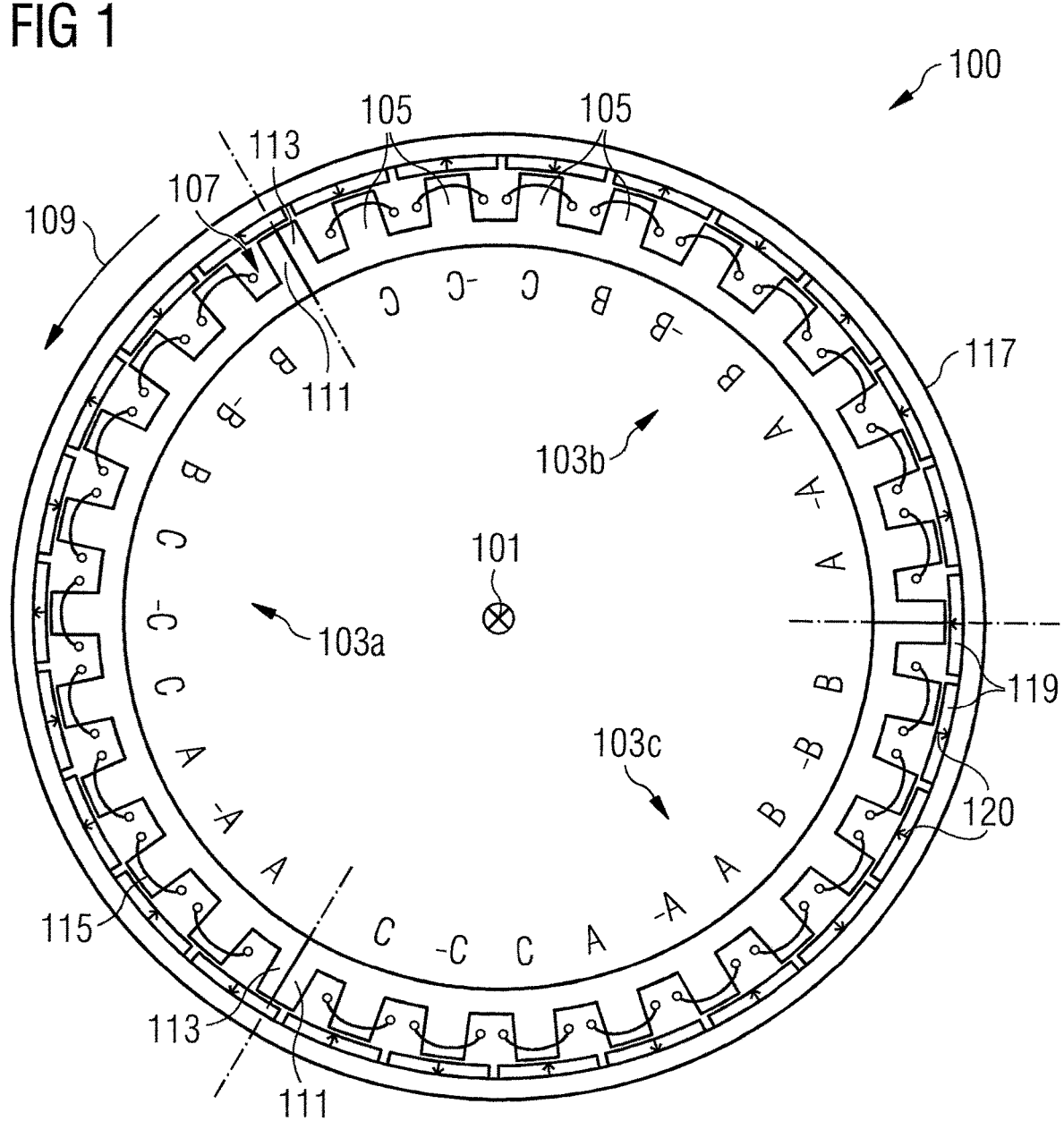

The arrangement 100 for an electrical machine having fractional slot topology according to an embodiment of the present invention illustrated in FIG. 1 in a frontal view (viewed along an axial direction 101) comprises plural stator segments 103a, 103b, 103c, each spanning a circumferential angle range of 120°. Each of the stator segments 103a, 103b, 103c has plural teeth 105 that alternate with plural slots 107 in the circumferential direction 109. Thereby, each stator segment 103a, 103b, 103c has at corresponding both circumferential ends a tooth portion 111 and 113, respectively. When the stator segments 103a, 103b, 103c are assembled as is illustrated in FIG. 1, the tooth portion 111 of one of the stator segments abuts (is connected with) with the tooth portion 113 of the circumferentially adjacent stator segment. By connecting the tooth portions 111 and 113, a structure similar to the teeth 105 evolves in the assembled state. However, different from the teeth 105, the structure evolved by connecting the tooth portions 111 and 113 does not carry any winding or any coil of any phase.

FIG. 1 illustrates an arrangement for an electrical machine providing three phases A, B and C. For each phase A, B, C of the plural phases, a conductor 115 is wound in coils around the teeth 105, wherein the number of coils of any phase A, B, C in any stator segment 103a, 103b, 103c is the same as the number of coils of any other phase in this stator segment. In particular, in the embodiment as illustrated in FIG. 1, the number of coils for the phase A in one of the stator segments 103a, 103b, 103c is three. Further, also the number of coils of any of the other phases, i.e. phases B or C, is also three in one stator segment.

The arrangement 100 further comprises a rotor 117 having plural permanent magnets 119 (alternatingly oriented as indicated by arrows 120) and being rotationally supported to be rotatable (around the axial direction 101) and thus also around the stator segments 103a, 103b, 103c, wherein the permanent magnets 119 are magnetically coupled to the coils (schematically illustrated only by the conductor 115, in reality the conductor can be wound several times around a tooth, thereby generating a coil).

When the rotor rotates relative to the stator segments, an electrical voltage is induced in the conductors 115 and an electrical current will be generated. The arrangement 100 may be comprised in a generator according to an embodiment of the present invention in order to produce, upon rotation of the rotor 117, an AC output power in three phases A, B, C.

The arrangement 100 illustrated in FIG. 1 (and also the arrangements illustrated in FIG. 2, 5, 6, 19, 20) may be considered to be a combination of two fractional slot topologies to create a new electrical machine with a balanced phase when multi-three phase electrical connection is applied. In the embodiment illustrated in FIG. 1, the electrical machine or arrangement 100 for an electrical machine may be considered to be a combination of three 9S/8P machine units and one 3S/2P machine unit, wherein xS/yP represents a machine unit having x slots and y poles. Thus, the combination results in an electrical machine 30S/26P.

Figure 3:
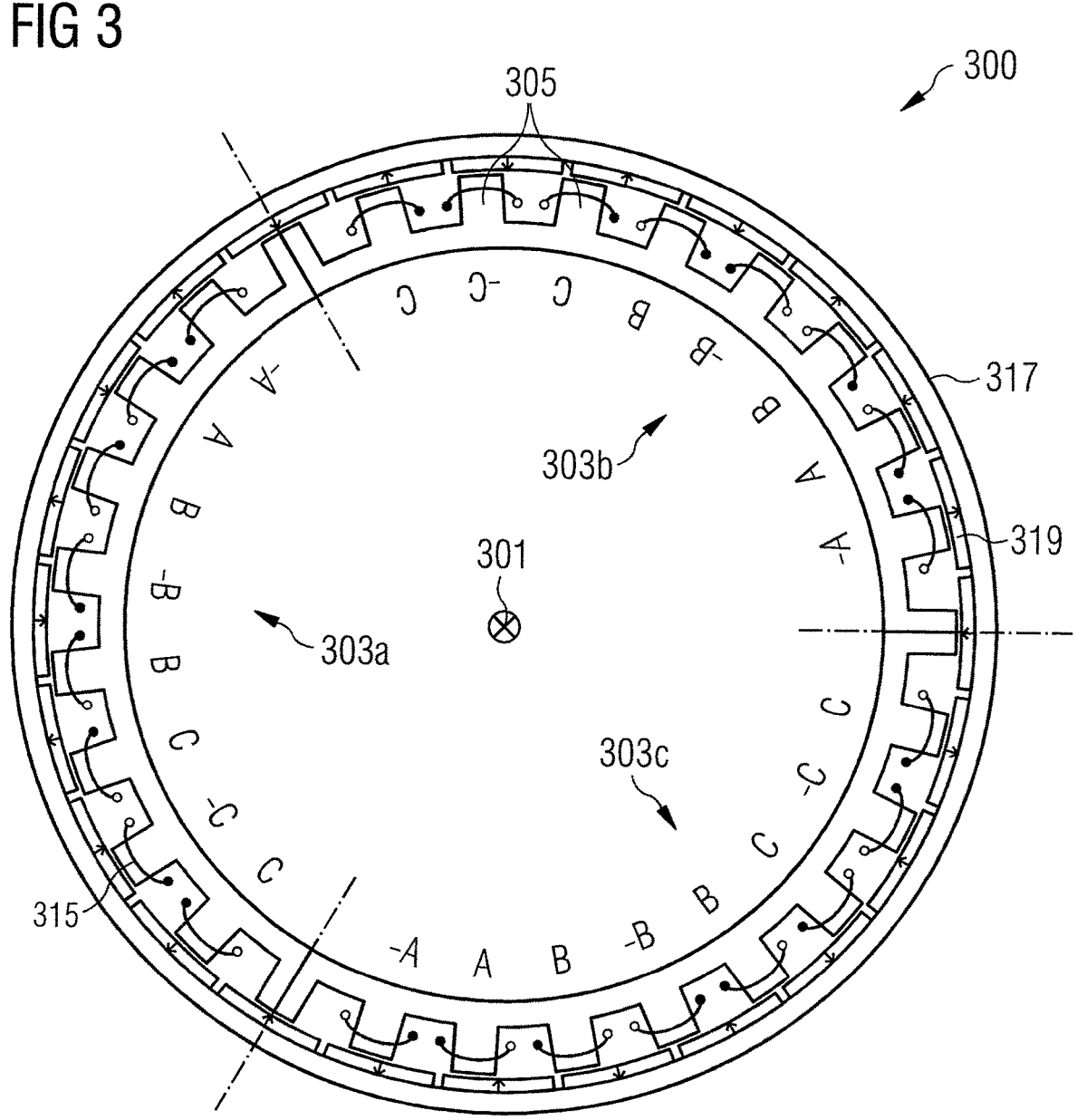
Figure 4:
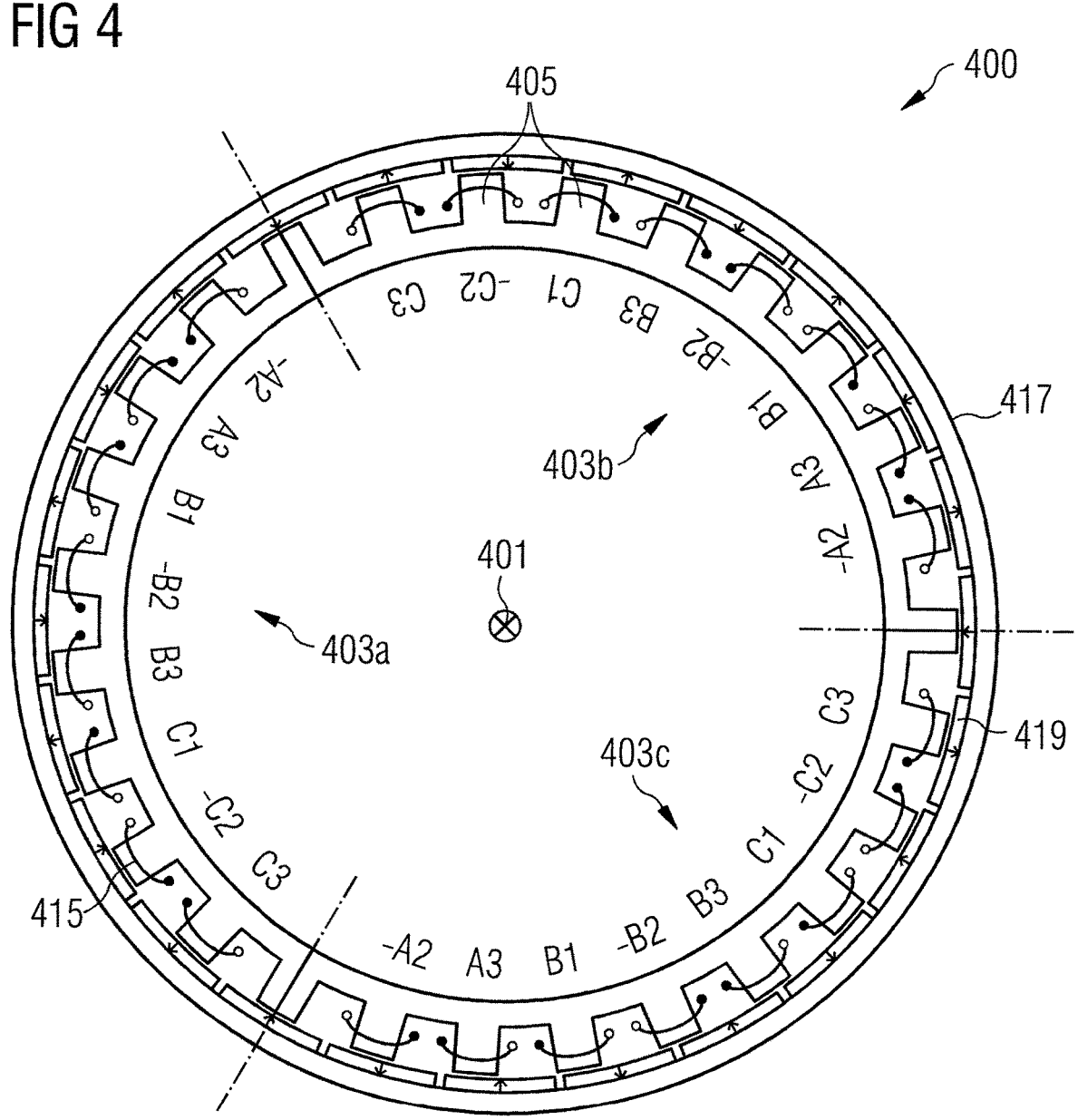

Conventionally, for Ns=Np+/−1, a 27 slots/24 poles (27S/24P) electrical machine consists of three 9S/8P machine units, as is illustrated in FIG. 3 as electrical machine 300. When trying to create a modular segmented stator starting from the electrical machine 300 illustrated in FIG. 3, with fully encapsulated electrical windings at the edge (i.e. at the circumferential ends of the respective stator segments), some windings must be removed from the conventional fractional-slot topology illustrated in FIG. 3, to allow the segmentation. For this single three-phase electrical machine, three coils belonging to phase A have to be removed, whereas three phases are not balanced any more, according to the conventional system. Similarly, unbalance between the electrical phases may exist as well as if a multi-three-phase electrical machine is used and only three teeth are treated as the redundant ones, as is illustrated in FIG. 4 as the conventional electrical machine 400.

Figure 2:
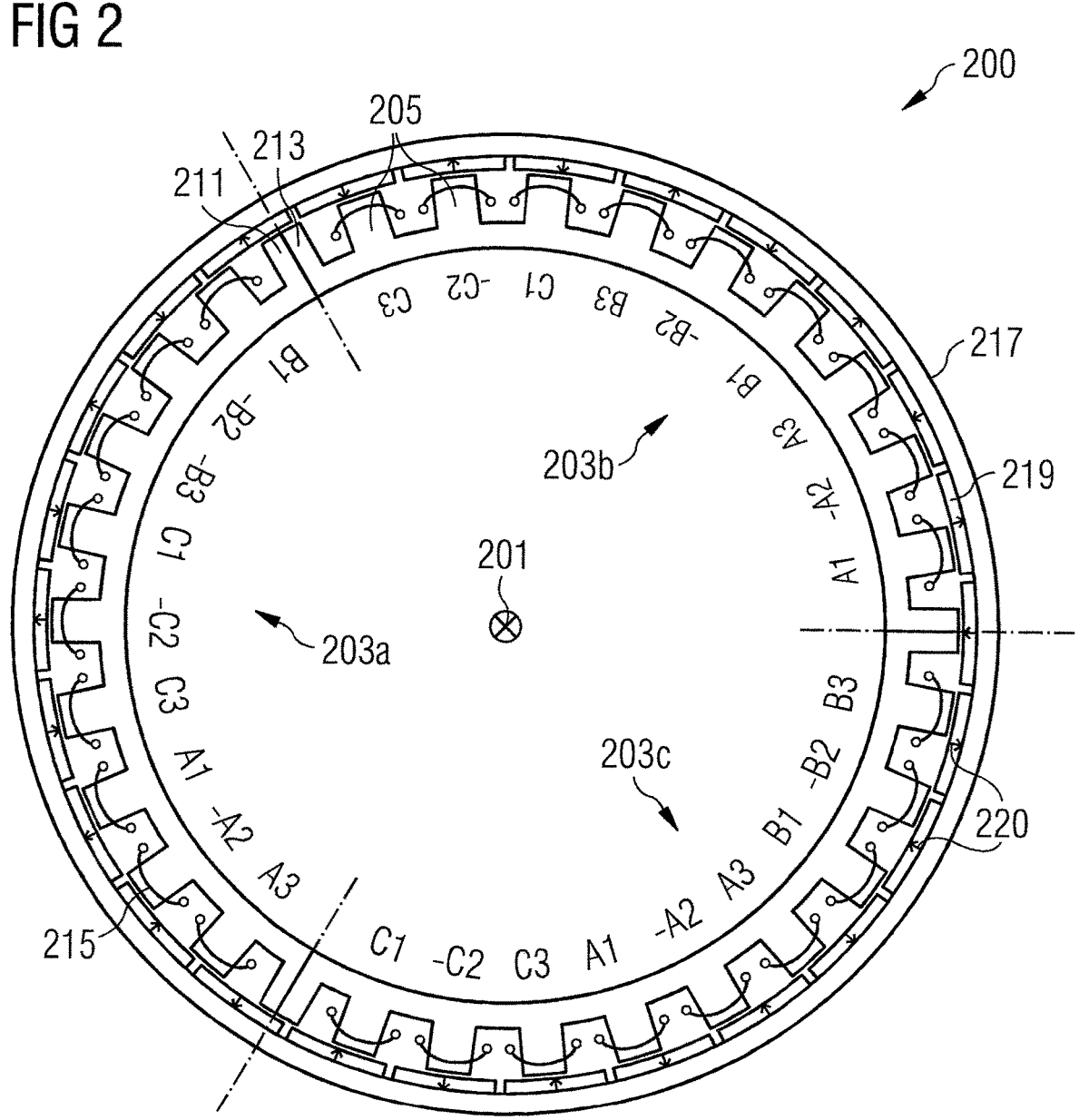

By introducing the fractional slot combination according to an embodiment of the present invention into the initial conventional topology, whilst its teeth are only left unwound for segmentation purposes, the three-phase system, as is illustrated in FIG. 1 or 2, is left balanced and can even be magnetically and thermally isolated from adjacent segments. In order to minimize the waste of permanent magnets, the three 9S/8P machine units are combined with the relatively small machine unit 3S/2P. Thereby, the modular electrical machine according to embodiments of the present invention may be reliably and safely manufactured.

Embodiments allow to build large wind power direct drive generators which are difficult to transport fully assembled. Thus, assembly of the plural stator segments may be carried out at the wind turbine operation site requiring transportation of the stator segments. The proposed modular segments 103a, 103b, 103c or 203a, 203b, 203c (see FIG. 1) have fully encapsulated armature windings, making them more robust for transportation and easier to manufacture using current well-known manufacturing methods. By applying the combination of a first fractional topology and a second fractional topology, no matter of a single three-phase or multi-three-phase winding will be balanced among each set, as can be taken from FIGS. 1 and 2.

In FIG. 1, all conductors 115 arranged around teeth 105 labelled with A or -A (conductor 115 is wound in opposite direction as in A) are electrically connected to each other which applies also to the other phases B and C.

In contrast, the conductors 215 in FIG. 2 wound around phases C1 and C2 are electrically not connected to each other, thereby providing a multiplicity of three phases, in particular three times three phases. Embodiments of the present invention support even more phases than three phases, such as four phases, five phases, six phases or even more phases. Embodiments of the present invention also support a different number of segments, such as two segments, four segments, five segments, six segments, seven segments, nine segments or even more stator segments.

Figure 5:
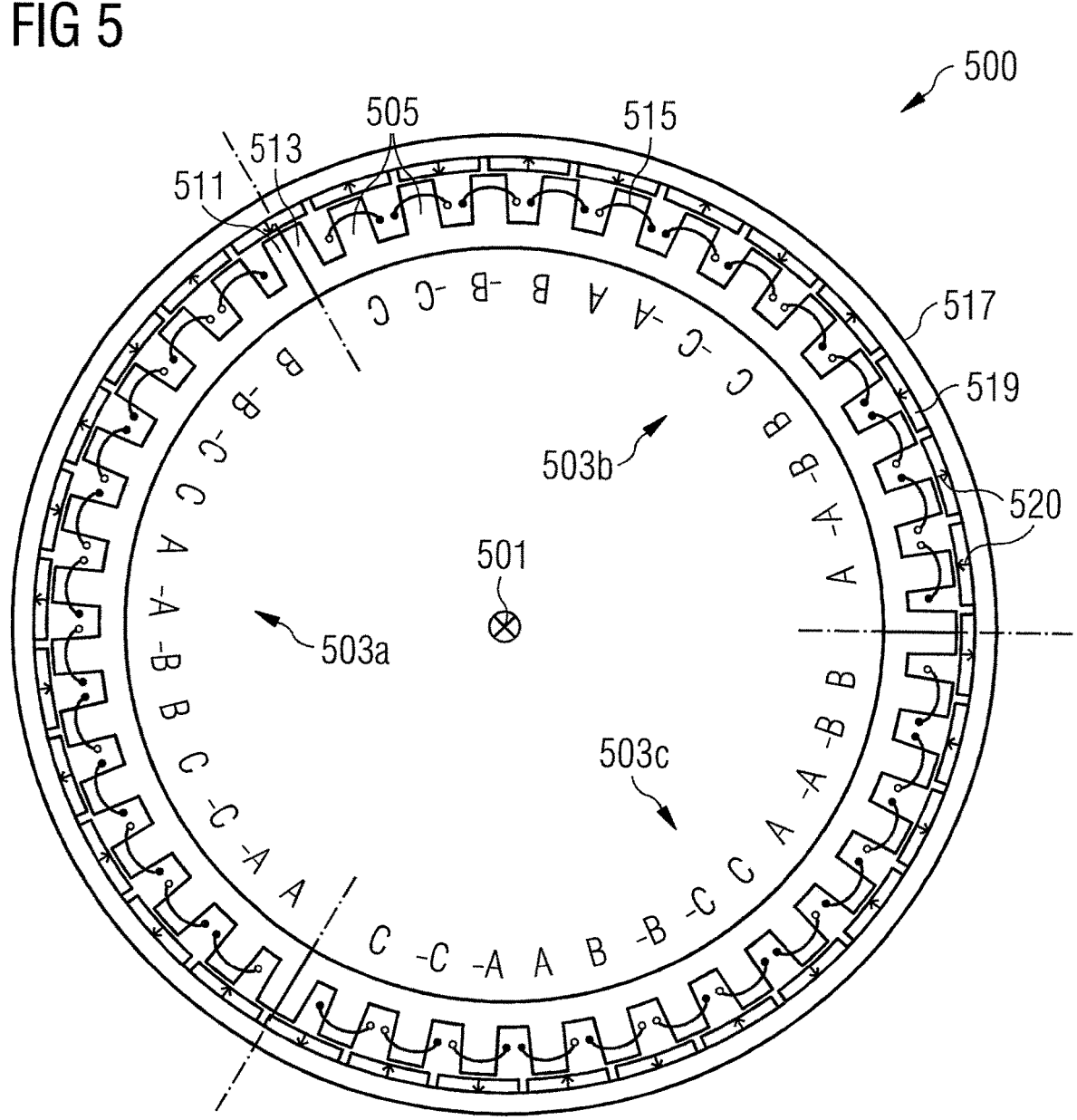

FIG. 5 schematically illustrates, in a frontal view along the axial direction 501, an arrangement 500 for an electrical machine according to another embodiment of the present invention providing three phases A, B, C. This embodiment originates from another kind of slot/pole number combinations, in particular Ns=Np+/−2.

Figure 7:
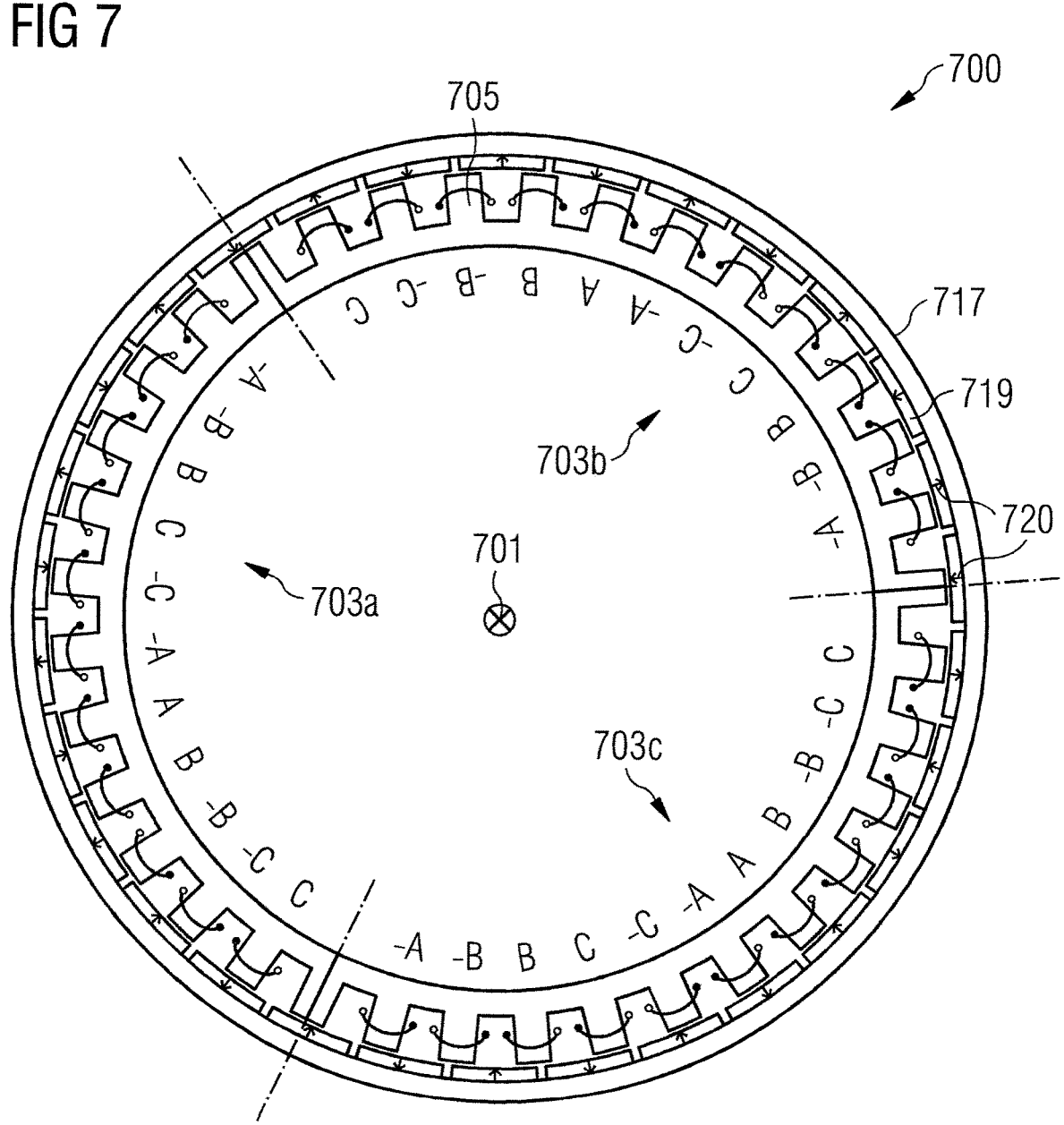
Figure 8:
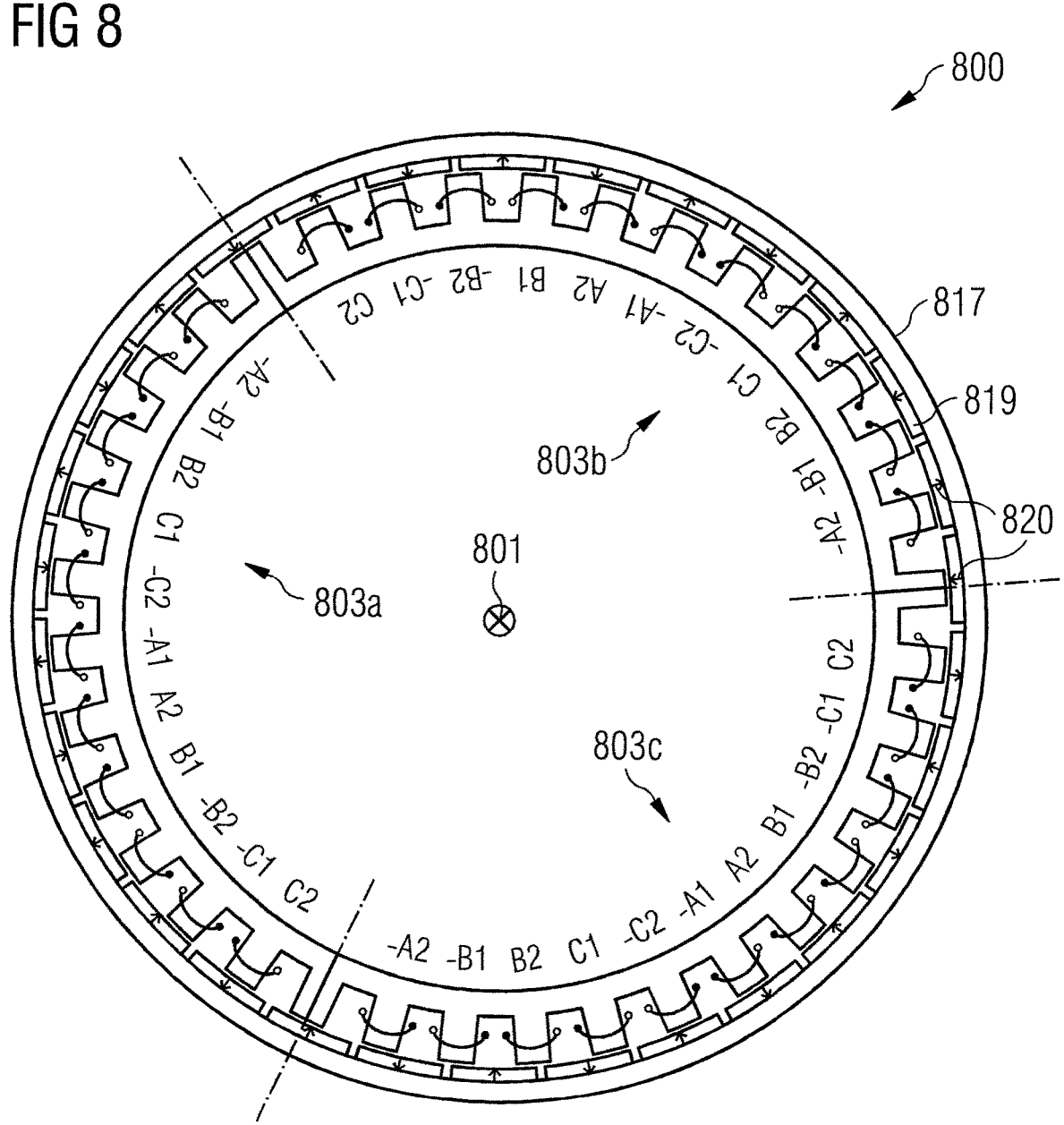

For this type, a conventional 36S/30P electrical machine, as is illustrated in FIG. 7, consists of three basic machine units 12S/10P. As can be taken from FIG. 7, there also exists an unbalance among each phase, since the slot/pole number is the triple integer times of 12S/10P. Under such condition, the three removed coils always belong to the same phase, as is illustrated in FIG. 7. If other electrical machines with non-triple integer times of 12S/10P electrical machine are used, the balanced three phases will be obtained. However, the multi-three-phase winding requires more redundant teeth as well, which is undesirable for real applications, as is shown in FIG. 8.

To cope with the problem of unbalance of phases, three 12S/10P machine units are combined with one 3S/2P machine units to obtain the arrangement 500 for an electrical machine having balanced phases in each stator segment. In particular, as can be taken from FIG. 5, each of the stator segments 503a, 503b, 503c comprises four coils for each phase, i.e. for the phases A, B, C. The total number of slots is 39 and the total number of poles is 32.

Figure 6:
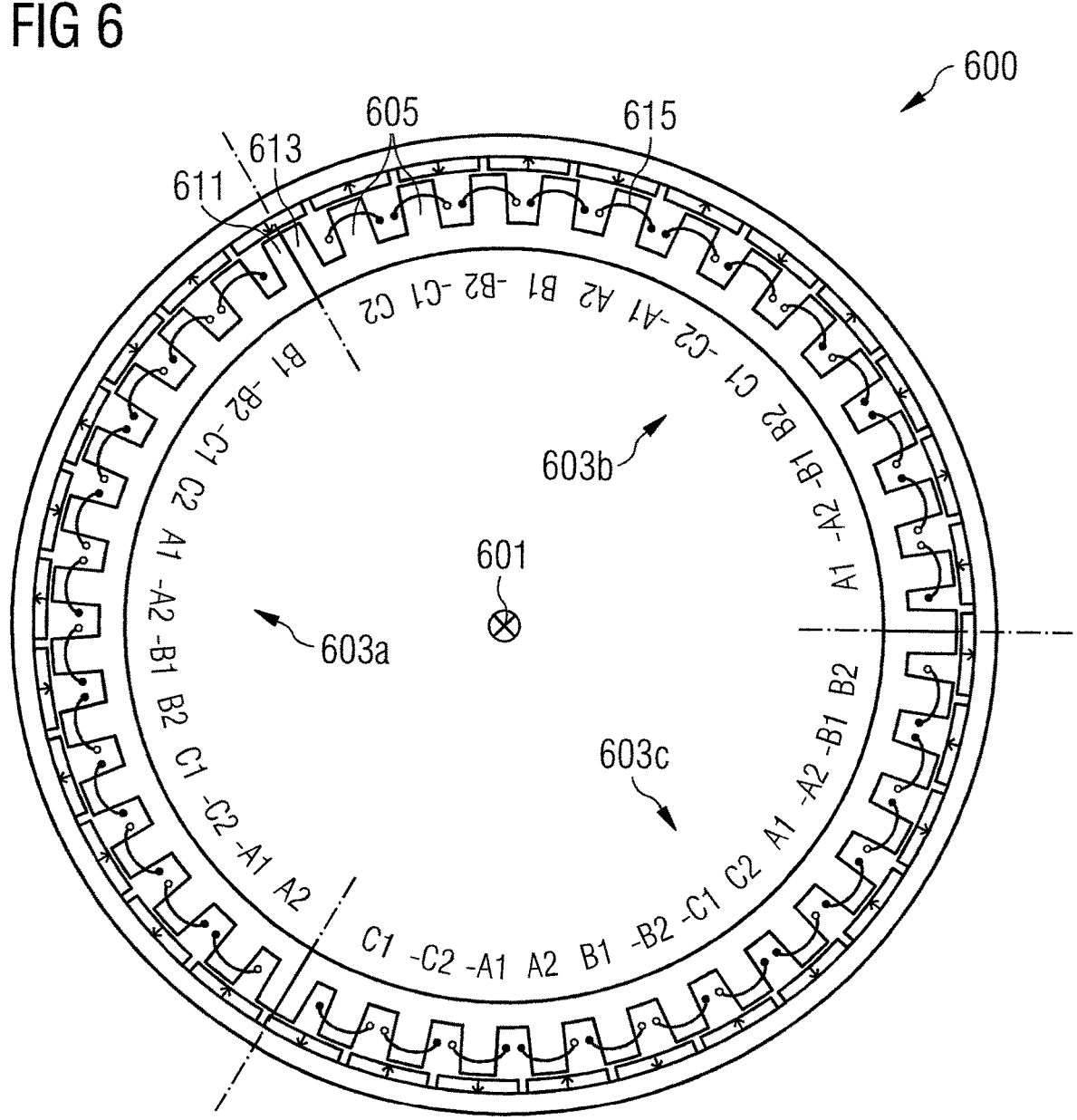

Furthermore, this concept can be applied also for a dual three-phase electrical machine as is illustrated in embodiment 600 in FIG. 6. For an arrangement for an electrical machine having three stator segments, the number of poles should, according to an embodiment of the present invention, satisfy the following equation Np≠3*k−2, wherein k is a positive integer. Furthermore, the number of slots may satisfy the following equation Ns/(m*GCD(Ns, Np/2))=n, wherein n is positive integer, Np is the total number of poles, Ns is the total number of slots, m is the number of phases, GCD(x,y) is the greatest common denominator of x and y.

According to an embodiment of the present invention, the modular machine may consist of the initial conventional fractional-slot electrical machine and the 3S/2P machine unit. The electrical machine used for providing redundant teeth may have different slot/pole number combinations which may depend on the particular requirement. For example, also a 6S/2P electrical machine may be used as the redundant unit as well.

According to an embodiment of the present invention, the arrangement is obtained by the combination of two distinct fractional-slot topologies and combining them into one machine. The "working" fractional-slot topology (27S/24P and 36S/30P for two examples, respectively) is added with a "redundant" fractional-slot topology (3S/2P for the examples illustrated in FIGS. 1, 2, 5 and 6) to create a balanced electrical machine with three unwound stator teeth and a balanced winding layout, as is illustrated in FIGS. 1, 2, 5 and 6. This allows for the unwound teeth (created by connecting the end portions 111, 113 of the stator segment) to be cut for the stator segmentation without compromising the stator armature coils, which benefits the manufacture and the transportation of the real electrical machines.

Figure 9:
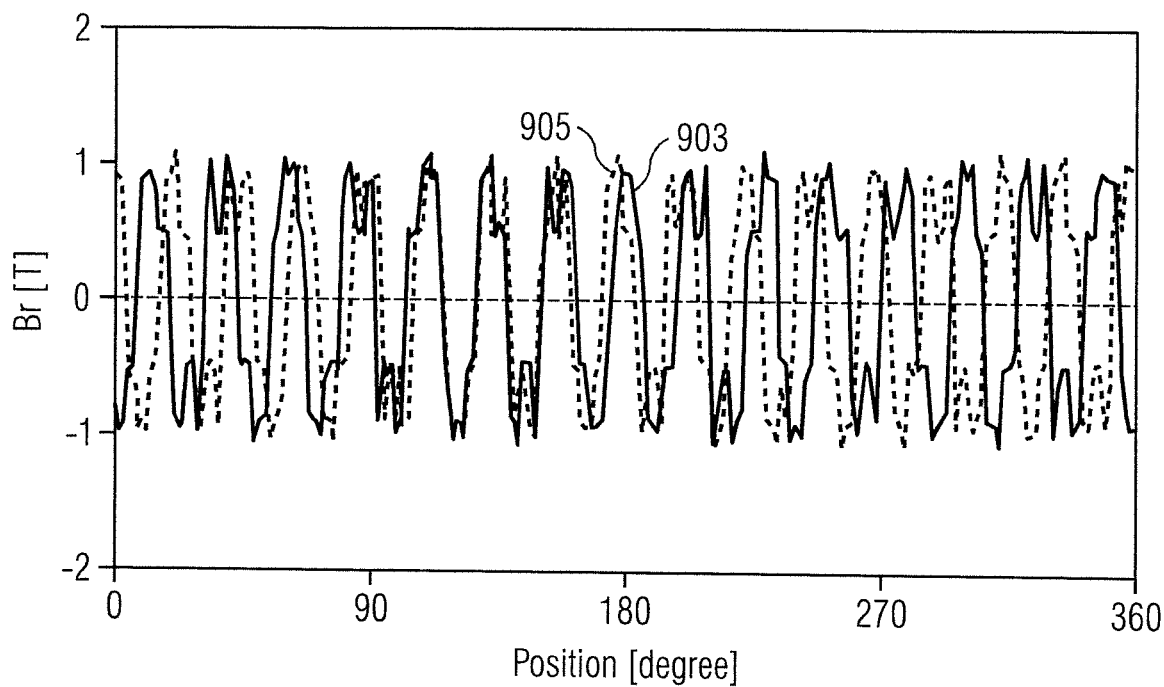
FIG. 9 illustrates curves of waveforms (the permanent magnetic field in the radial direction)
Figure 10:
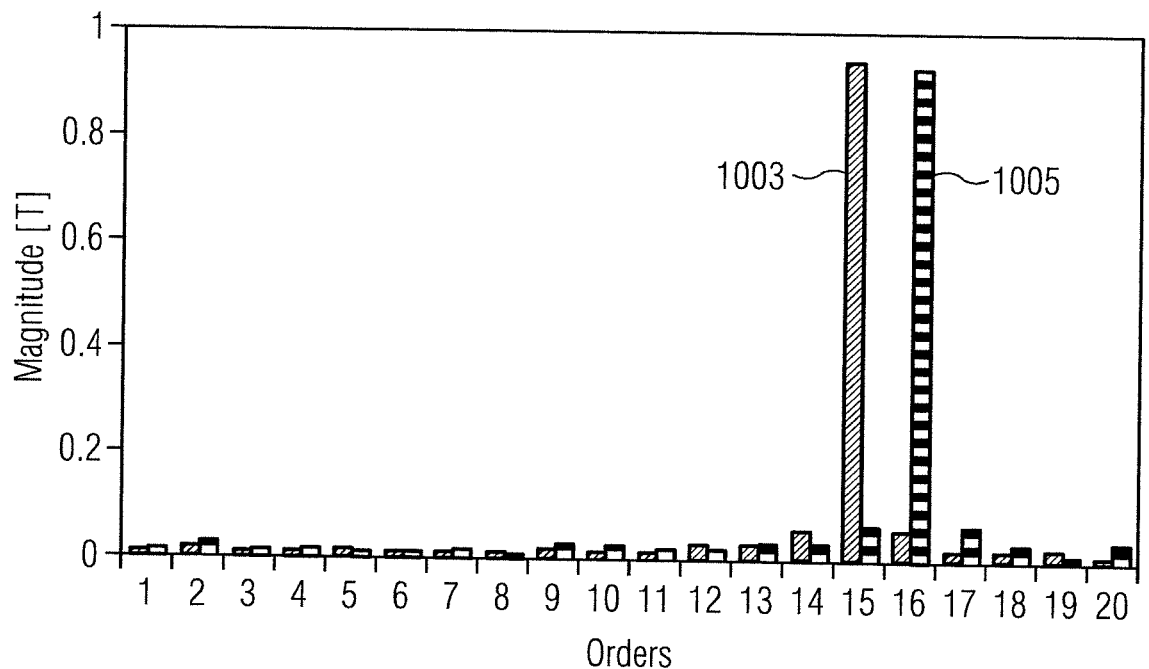
FIG. 10 illustrates the magnitude of different harmonic orders of the permanent magnetic field.
Figure 11:
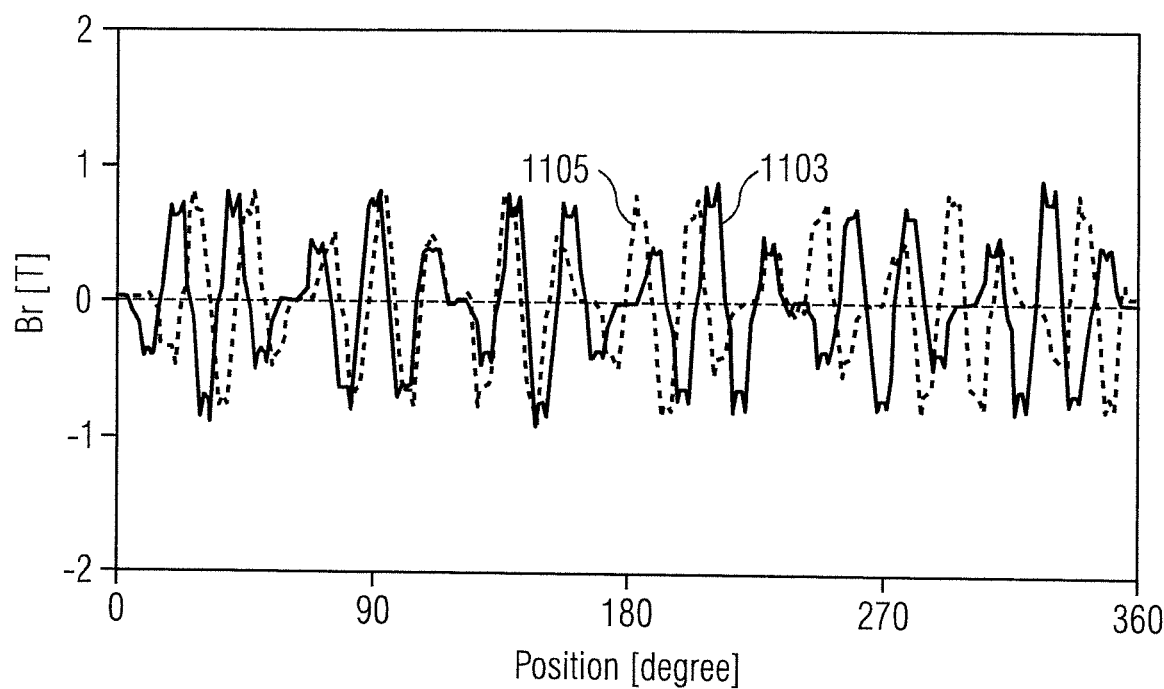
FIG. 11 illustrates the magnetic field in the radial direction due to the armature field.
Figure 12:
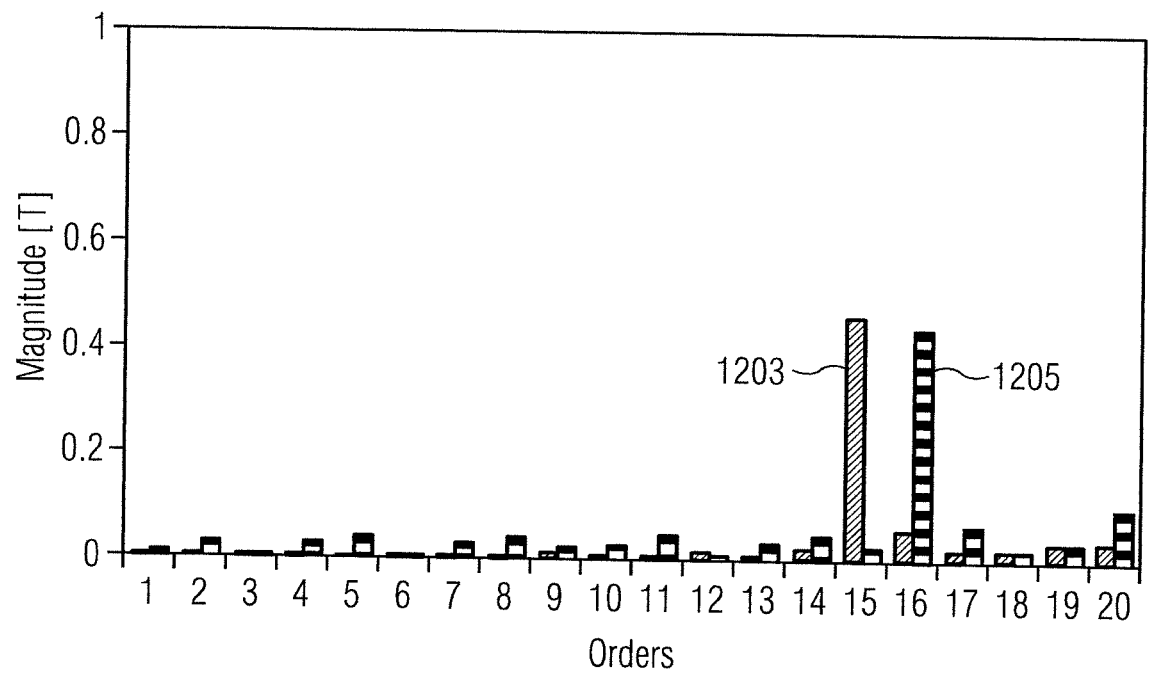
FIG. 12 illustrates the magnitude of harmonic orders due to the armature field.

FIGS. 9 to 19 exemplarily illustrate some electrical properties and performances of the 36S/30P+3S/2P modular machine according to embodiments of the present invention compared with the conventional 36S/30P electrical machine. Thereby, FIGS. 9, 10, 11, 12 illustrate open-circuit air-gap flux density due to the permanent magnet and the air-gap flux density corresponding to the armature field, respectively. Thereby, the air-gap flux density due to the permanent magnet field are illustrated in FIGS. 9 and 10, while the air-gap flux density due to the armature field (the permanent magnets are set to zero and a current is injected in the coils) are illustrated in FIGS. 11 and 12.

Thereby, the curves or bars 903, 1003, 1103, 1203 relate to the conventional 36S/30P electrical machine, while the curves or bars 905, 1005, 1105, 1205 relate to the 30S/30P+3S/2P electrical machine according to an embodiment of the present invention.

From FIGS. 9 to 12 it can be observed that the variation of the working harmonic order which is the same as the rotor pole pair number. Another change is the appearance of other harmonics for the proposed modular machine. The influence of these harmonics may be checked, especially for rotor loss.

Figure 13:
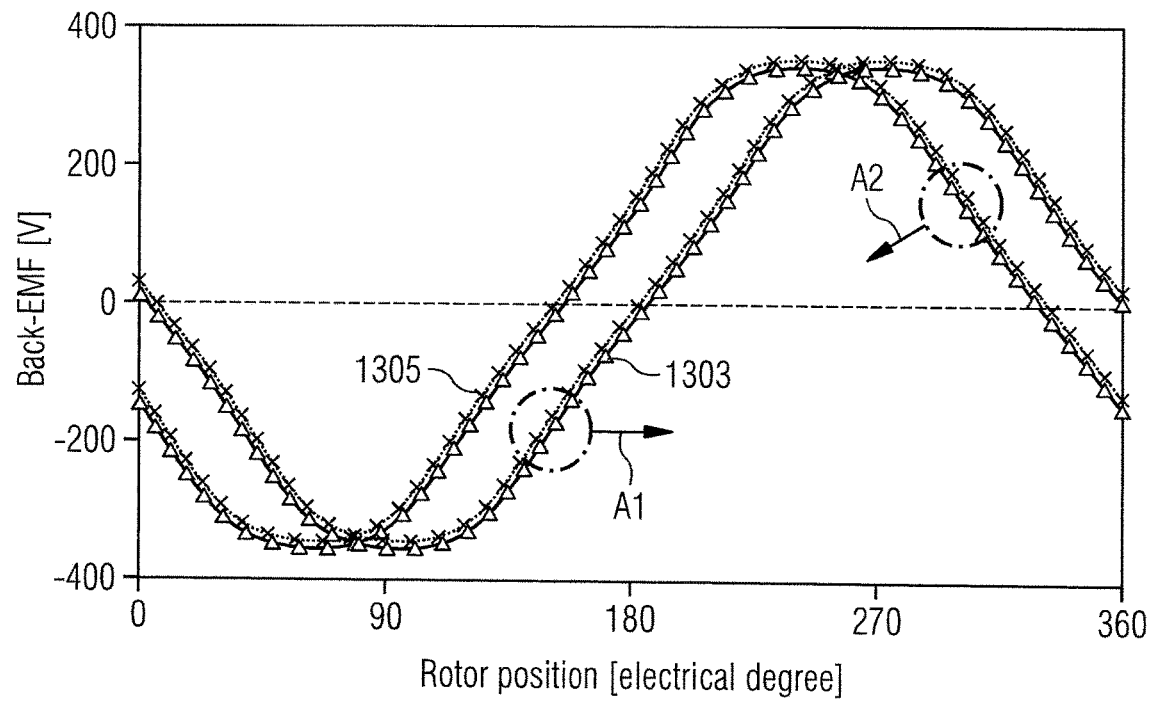
FIG. 13 illustrates the back electromagnetic force for particular phases.
Figure 14:
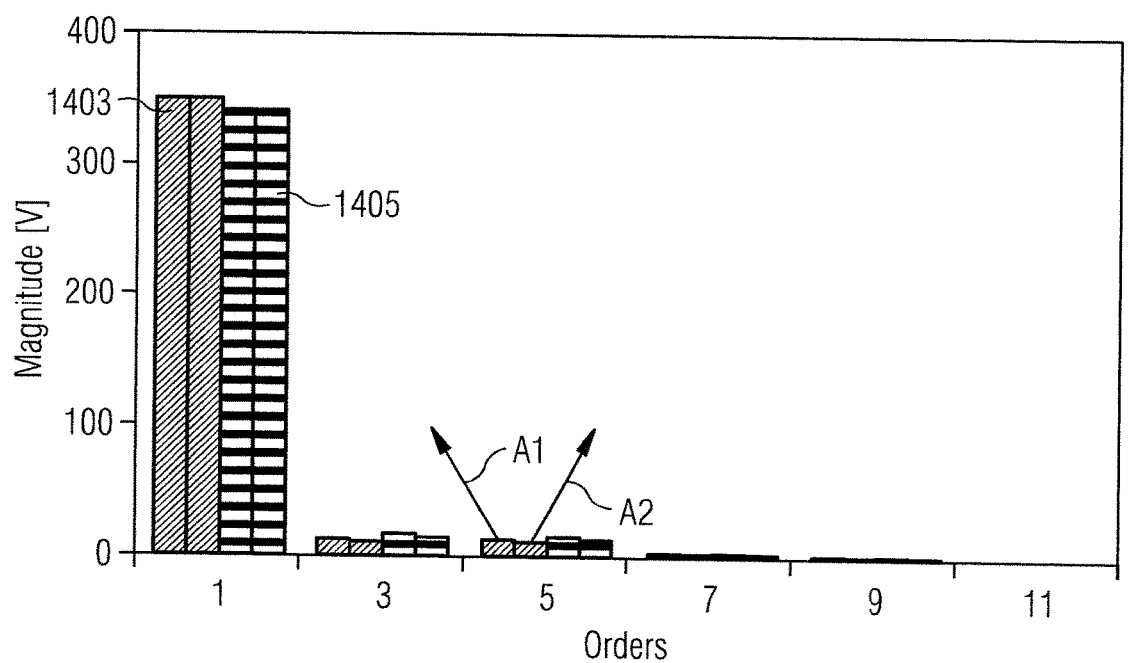
FIG. 14 illustrates the magnitude of harmonic orders for different phases.
Figure 15:
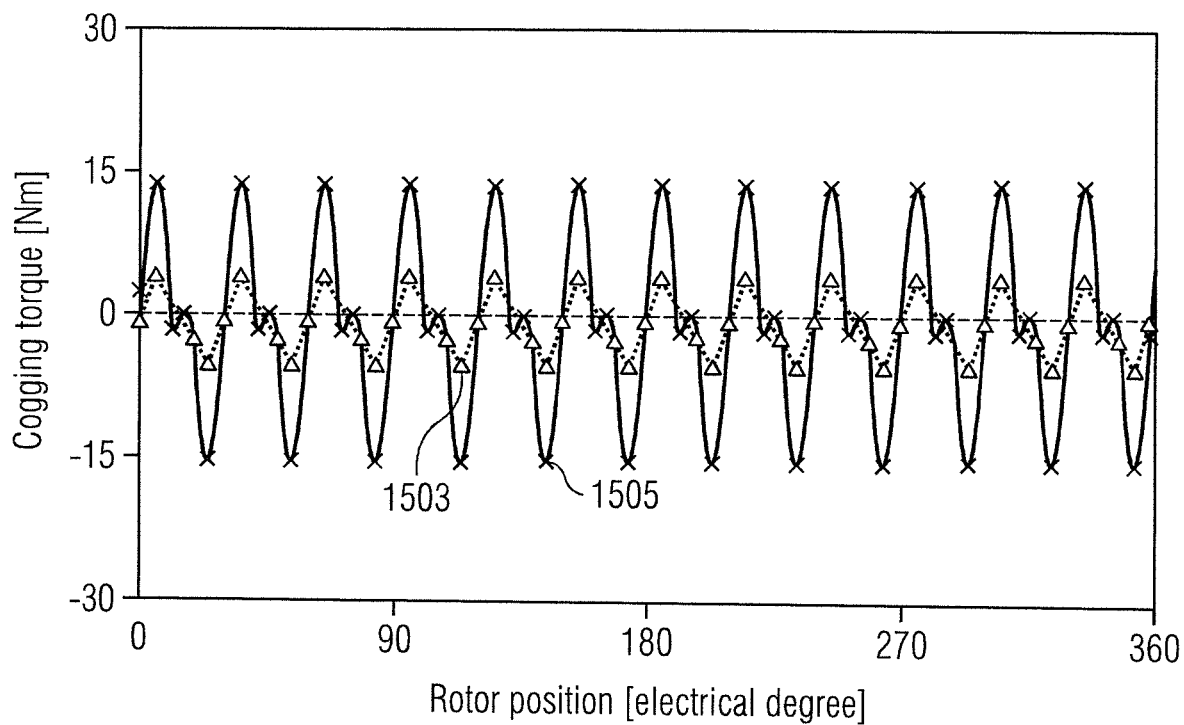
FIG. 15 illustrates the cogging torque.
Figure 16:
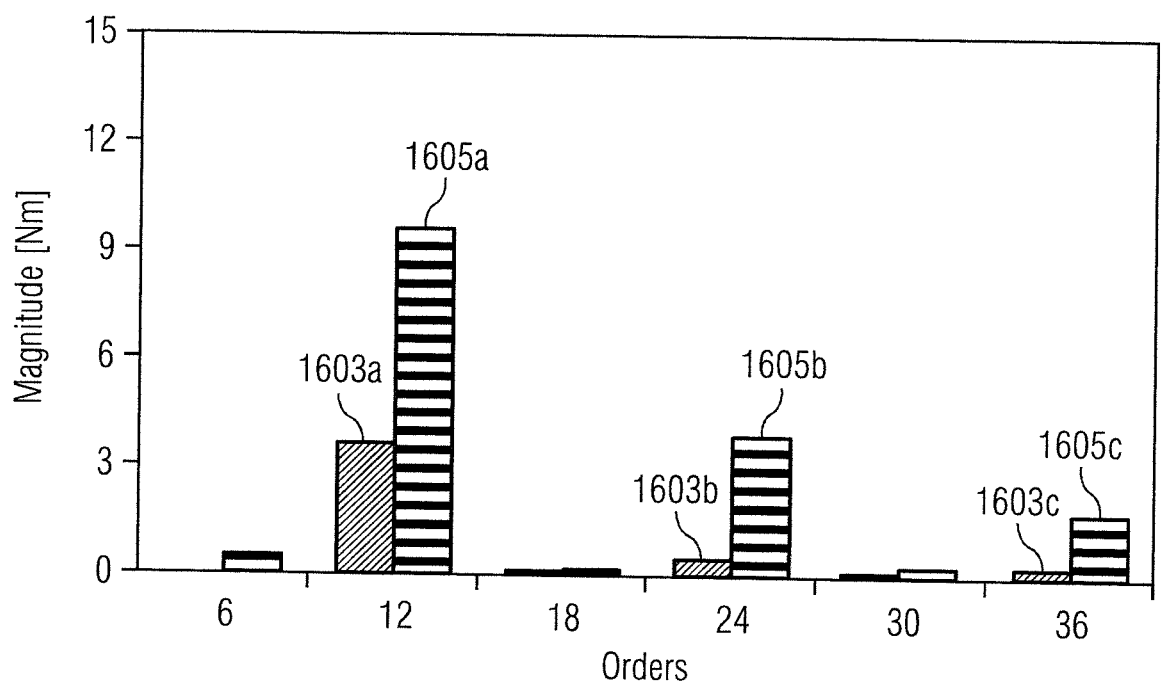
FIG. 16 illustrates the magnitudes of harmonic orders due to the cogging torque.
Figure 17:
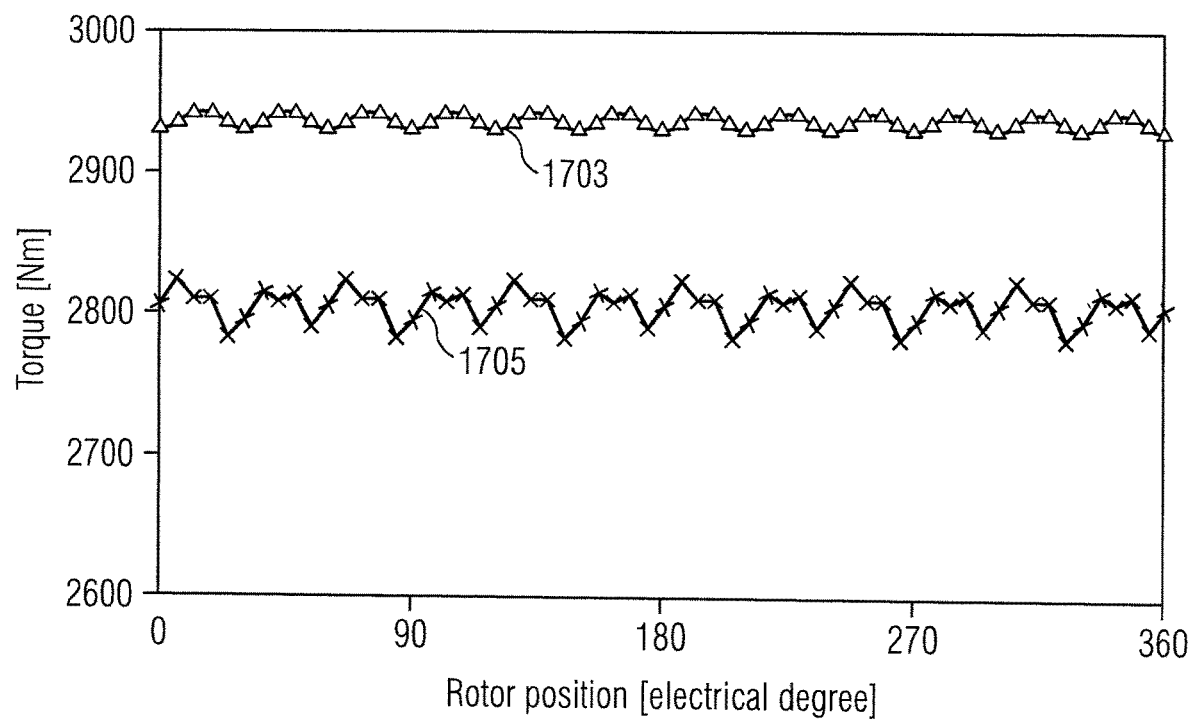
FIG. 17 illustrates the on-load torque.
Figure 18:
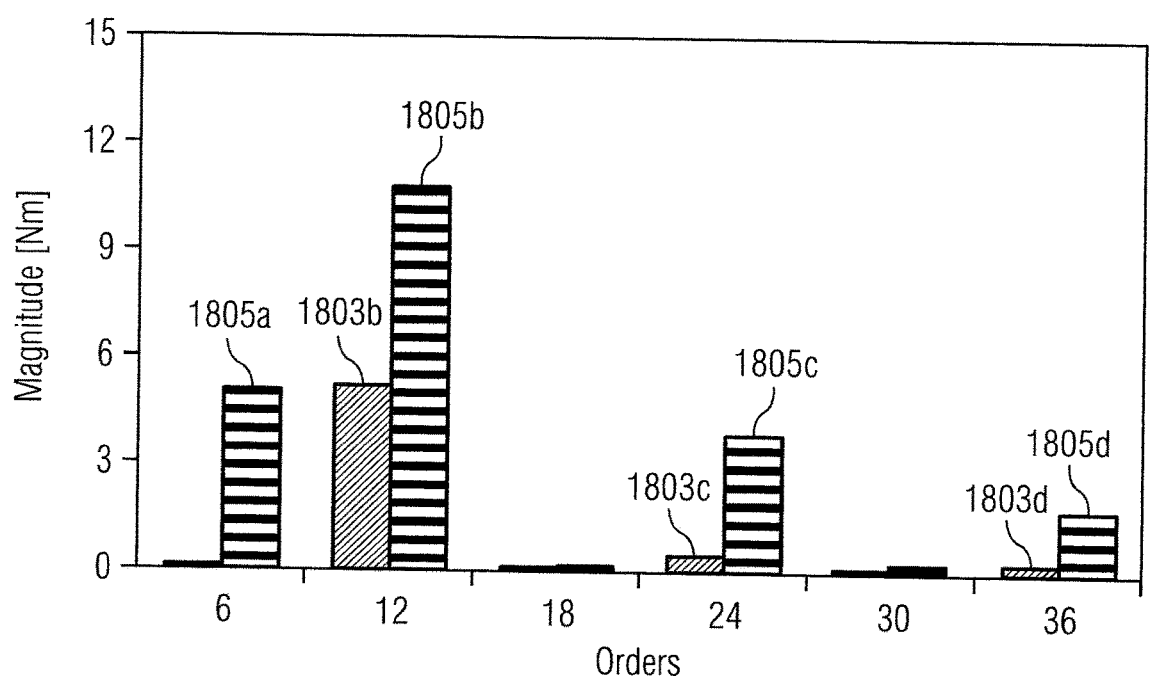
FIG. 18 illustrates the magnitude of harmonic orders of the on-load torque.

Since the proposed modular machine has balanced two sets of windings, the open-circuit back-EMF only has a phase-shift difference, as shown in FIGS. 13 and 14, wherein the curves 1303 or the bar 1403 relate to the conventional 36S/30P electrical machine, while the curve 1305 or the bar 1405 relates to the 36S/30P+3S/2P electrical machine according to an embodiment of the present invention.

FIGS. 15 to 18 illustrate the torque performance which may be considered as one of the most important quantities in electrical machines. Thereby, the curves or bars 1503, 1603, 1703, 1803 relate to the conventional 36S/30P electrical machine, while the curves or bars 1505, 1605, 1705, 1805 relate to the 36S/30P+3S/2P electrical machine according to an embodiment of the present invention. For the proposed machine, both open-circuit and on-load torque are shown in the figures, while the cogging torque is corresponding to the open-circuit condition. In order to mimic the real large machine operation, the current is enlarged to 15 times of the rated value, which can provide the similar situation condition as the real generators.

The FIGS. 15 to 18 show that the proposed machine will have larger cogging torque and on-load torque ripple compared with the conventional electrical machine. This may be due to the non-uniform distribution of stator slots and teeth, which may cause the reduction of minimal stored energy points. However, the on-load torque does not evidently increase. The increase of the $6^{th}$ order for the proposed and the $12^{th}$ for the conventional machine may be due to the armature reaction. The torque ripple reduction techniques used for other electrical machines may be applied as well, such as skewing, magnet shaping, notching, etc. The rotor permanent magnet and yoke eddy current losses are summarized in the following table 1.

TABLE 1

|  | Permanent magnet | | Yoke | |
| --- | --- | --- | --- | --- |
|  | Open-circuit(W) | On-Load (W) | Open-circuit(W) | On-Load (W) |
| 36S/30P | 92.08 | 547.33 | 105.34 | 996.84 |
| 36S/30P + 3S/2P | 85.08 | 459.12 | 99.26 | 1109.59 |

Table 1 demonstrates that the proposed machine has a lower rotor permanent magnet and yoke eddy current loss, while this advantage may be kept for on-load permanent magnet loss. However, the on-load rotor yoke eddy current loss of the proposed machine may be larger than the conventional electrical machine. The severe armature reaction should be the reason.

FIGS. 19 and 20 schematically illustrate, in a frontal view, other arrangements 1900 and 2000 according to embodiments of the present invention, wherein six stator segments are assembled to form the stator. Thus, in this case, the arrangement 1900 comprises six stator segments 1903a, 1903b, 1903c, 1903d, 1903e, 1903f. In each of the stator segments 1903a,b,c,d,e,f for each of the phases A, B, C, two coils are wound around the teeth 1905. In the embodiments as illustrated in FIGS. 19 and 20, as a redundant machine, the 6S/2P machine unit is used. When the redundant electrical machine would contain only three slots, it may cause undesirable unbalanced magnetic fault (UMF). Since the UMF may have other side effects on machine performance, such as noise and vibration, the unbalanced magnetic force should be minimized, as is achieved by using the 6S/2P machine unit. The effective approach to eliminate the UMF is adopting the rotational symmetry structure. For the electrical machine having six stator segments, the number of poles Np may satisfy the following equation:

$$Np \neq 3*k-1, \text{ wherein } k \text{ is positive integer.}$$

Further, the number of slots Ns and the number of poles is related to each other or must satisfy the following equation:

$$Ns/(GCD(Ns,Np/2))) \neq 2*n-1, \text{ wherein } n \text{ is positive integer.}$$

From the above equations it can be seen that the condition for 6S/2P redundant electrical machine may be stricter compared to the 3S/2P machine unit.

The arrangement 200 in FIG. 2 provides dual three-phase output. Other embodiments may provide multiple three-phase output.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. An arrangement for an electrical machine having fractional slot topology, comprising:
   a plurality of stator segments, each stator segment having teeth alternating with slots in a circumferential direction, each stator segment having at both circumferential ends a tooth portion; and
   for each phase of a plurality of phases a conductor wound in coils around the teeth, wherein a number of coils of any phase in any stator segment is the same as a number of coils of any other phase in the stator segment;
   wherein the fractional slot topology is given by combining a first fractional topology times a number of stator segments and a second fractional topology being different from the first fractional topology.

2. The arrangement according to claim 1, further comprising:
   a rotor having a plurality of permanent magnets and rotationally supported to be rotatable around the stator segments, the permanent magnets being magnetically coupled to the coils.

3. The arrangement according to claim 1, wherein the first fractional topology and/or the second fractional topology is given by:

$Ns=Np+/-1$ or $Ns=Np+/-2$, wherein
   Np is the total number of poles,
   Ns is the total number of slots.

4. The arrangement according to claim 1, wherein the number of stator segments is three, $Np \neq 3 * k-2$, wherein $k$ is a positive integer, $Ns/(m*GCD(Ns,Np/2)))=n$, wherein $n$ is positive integer, Np is the total number of poles,
   Ns is the total number of slots,
   m is the number of phases,
   GCD(x,y) is the greatest common denominator of x and y.

5. The arrangement according to claim 1, wherein the number of stator segments is three and
   wherein the first fractional topology is nine slots and eight poles and the second fractional topology is three slots and two poles or
   wherein the first fractional topology is 12 slots and 10 poles and the second fractional topology is three slots and two poles.

6. The arrangement according to claim 1, wherein:
   the number of stator segments is six,
   $Np \neq 3* k 1$, wherein k is a positive integer,
   $Ns/(GCD(Ns, Np/2)))\neq 2* n-1$, wherein n is a positive integer,
   Np is a total number of poles and
   Ns is a total number of slots, and
   GCD(x,y) is a greatest common denominator of x and y,
   further wherein the number of phases is any positive integer number.

7. The arrangement according to claim 1, wherein the number of stator segments is six and
   wherein the first fractional topology is 12 slots and 10 poles and the second fractional topology is six slots and two poles.

8. The arrangement according to claim 1, wherein a number of phases is three or larger than three.

9. A generator, comprising:
   an arrangement according to claim 1.

10. A wind turbine, comprising:
    a turbine rotor with a plurality of blades;
    a generator according to claim 1 coupled to the turbine rotor; and
    a converter coupled to an output terminal of the generator.

11. A method of manufacturing an arrangement for an electrical machine having fractional slot topology, the method comprising:
    providing a plurality of stator segments, each stator segment having teeth alternating with slots in a circumferential direction, each stator segment having at both circumferential ends a tooth portion;
    assembling the stator segments by connecting the stator segments at circumferential ends of the stator segments; and
    arranging, for each phase of a plurality of phases a conductor in coils around the teeth, wherein a number of coils of any phase in any stator segment is the same as a number of coils of any other phase in the stator segment;
    wherein the fractional slot topology is given by combining a first fractional topology times a number of stator segments and a second fractional topology being different from the first fractional topology.

12. The method according to claim 11, further comprising:
    arranging a rotor having plural permanent magnets and being rotationally supported to be rotatable around the assembled stator segments, such that the permanent magnets are magnetically coupled to the coils.

* * * * *